3,030,393
Patented Apr. 17, 1962

3,030,393
METHOD FOR PRODUCING ALKALI METAL AND ALKALINE EARTH METAL CYCLOPENTADIENYLS AND TRANSITION METAL COMPOUNDS DERIVED THEREFROM
Jack J. Bulloff, Dayton, Ohio, assignor to The Commonwealth Engineering Company of Ohio, Dayton, Ohio, a corporation of Ohio
No Drawing. Filed Mar. 21, 1955, Ser. No. 495,769
1 Claim. (Cl. 260—429)

This invention relates to alkali metal and alkaline earth metal cyclopentadienyls to processes for their production, and to methods of converting the cyclopentadienyls to other important cyclopentadienyl compounds.

One object of the invention is to produce the alkali metal and alkaline earth metal cyclopentadienyls by reacting cyclopentadiene with commercially available alkali metal or alkaline earth metal hydrides.

Another object is to produce transition metal cyclopentadienyls or their cyclopentadienylium cations without the use of special, relatively expensive reagents such as Grignards, complex amine thiocyanates, acetylacetonates, carbonyls, activated Haber catalysts or the like, and a process that is simple and economical as compared to the known processes involving the use of liquid ammonia reactors, evacuated gaseous systems, and the like.

A further object is to provide a method for preparing alkali metal or alkaline earth metal cyclopendadienyls that may be used in situ, i.e., without isolation from the medium in which they are prepared, as intermediates for subsequent or immediate conversion to other cyclopentadienyl products.

An additional object is to provide a process for preparing alkali metal or alkaline earth metal cyclopendadienyls that may be reacted in situ with transition metal compounds in vapor form for the production of the corresponding transition metal cyclopentadienyl compounds.

In accordance with one modification of the invention, the alkali metal and alkaline earth metal cyclopentadienyls are prepared by adding the appropriate alkali metal or alkaline earth metal hydride to a solution of cyclopentadiene in a chemically inert solvent which may be, for instance, an ether, a cyclic ether, a hydrocarbon, or any covalent solvent which does not contain active hydrogen or functional substituents.

Alkali metal hydrides which may be reacted with the cyclopentadiene include the hydrides of lithium, sodium, potassium, rubidium and cesium.

Alkaline earth metal hydrides that may be reacted with the cyclopentadiene include the hydrides of calcium, strontium and barium.

The cyclopentadiene may be obtained by depolymerization of a polycyclopentadiene such as the commonly available dimer, dicyclopentadiene, under any suitable depolymerizing conditions.

Illustratively, in preparing sodium cyclopentadienyl, the cyclopentadiene is dissolved in the selected inert solvent and sodium hydride is added to the solution until the evolution of hydrogen ceases. The reaction proceeds as follows:

(1)     $C_5H_6 + NaH \rightarrow NaC_5H_5 + H_2\uparrow$

The sodium cyclopendadienyl may be separated from the solvent, or the solution thereof may be used directly as intermediate for the production of transition metal cyclopentadienyls or their cyclopentadienylium cations. In the latter event, a polyvalent metallic compound which is soluble in the inert solvent, and which may be a halide, preferably the chloride, of titanium, chromium, molybdenum, tungsten, manganese, rhenium, osmium, iridium, platinum, is added to the solution. The reaction proceeds according to the equation:

(2)     $2NaC_5H_5 + MX \rightarrow M(C_5H_5)_2X_{x-2} + 2NaX$ where X represents halogen and x represents the valency of the metal M and is at least 2.

The NaX is filtered off, and the transition metal cyclopentadienyl is recrystallized from the solution by evaporation.

The specific formula for the primary product of Reaction 2 depends on the polyvalent metallic compound added to the solution of alkali metal or alkaline earth metal cyclopentadienyl. Thus, if the valence of the metal M is 2, the product has the formula $M(C_5H_5)_2$. If the metal, M, has a valence of 3, a product of the formula $M(C_5H_5)_2$ may result, if reduction occurs. In general, the primary product of reaction (2) has the formula $M(C_5H_5)_2X_{x-2}$, X representing halogen and x representing the valency of the metal M and being at least 2.

In some instances, the transition metal M in the primary product of Reaction 2 may have a valence less than the metal M of the halide added to the solution. This happens, for example, when either ruthenium chloride or ferric chloride is added to the alkali metal or alkaline earth metal cyclopentadienyl solution, and reduction to the bivalent forms $Ru(C_5H_5)_2$ or $Fe(C_5H_5)_2$ occurs.

According to another modification of the invention, the alkali metal or alkaline earth metal hydride such as sodium hydride, is placed in a tube and cyclopentadiene vapor is passed therethrough until the hydride is converted to sodium cyclophentadienyl. To convert the dry, particulate sodium cyclopentadienyl to the transition metal derivative the transition metal halide, for example, ferric chloride, is passed through the tube in vapor form and the emerging vapor is condensed to obtain the solid iron dicyclopentadienyl.

Alternatively, the alkali metal or alkaline earth metal cyclopentadienyl, in the dry particulate form, may be spread on a fine-mesh screen, and hot vapors of the transition metal halide may be passed thereover. For example, if tantalum pentachloride, in hot vapor form, is passed over calcium cyclopentadienyl, tantalum dicyclopentadienyl trichloride is produced and, after cooling thereof, may be shaken off the screen and purified by recrystallization from chloroform.

The cyclopentadiene may be obtained by depolymerization of the crude polymer using any suitable apparatus by means of which the polymer is depolymerized by heat and the gaseous cyclopentadiene evolved is recovered and condensed.

The following examples are given to illustrate specific embodiments of the invention, it being understood that these examples are not intended as limitative.

*Example I*

About 66 gms. of cyclopentadiene were passed into one liter of Amsco Naphthal Mineral Spirits, and 24 gms. of sodium hydride were added thereto slowly, with stirring. After evolution of hydrogen ceased, 160 gms. of ferric chloride were added gradually with stirring, to the solution of sodium cyclopentadienyl. The solution was then filtered, the insolubles (NaCl and other materials) were discarded, and the filtrate was placed in a flask. The solvent was removed by evacuation, using a Welch pump. The flask was then transferred to a water bath, and the product, iron biscyclopentadienyl, was sublimed into a trap, using a vacuum of 1.5 mm. Hg. The yield of $Fe(C_5H_5)_2$ was figured as 160 gms., the gain in weight of the trap.

*Example II*

The procedure of Example I was repeated, except that the solvent was tetrahydrofuran and 127 gms. of ferrous chloride ($FeCl_2$) were added, gradually, to the sodium cyclopentadienyl solution. Also, a different procedure was used to isolate the iron compound, the solvent being boiled off, the residue cooled, and the crystal crop collected in a sintered filter. The first crop of crystals weighed 102 gms.; the second crop weighed 30 gms.

*Example III*

Cyclopentadien (66 gms.) was added to one liter of iso-octane as in Example I. Calcium hydride (21 gms.) was gradually added to the solution. After evolution of hydrogen ceased, the solution was transferred to a flask and the iso-octane was pumped off by a trap-protected Welch pump, leaving a paste-like residue of 80 gms. of calcium cyclopentadienyl [$Ca(C_5H_5)_2$].

*Example IV*

The calcium cyclopentadienyl of Example III was distributed on a piece of fine mesh screening 51" long and 4" wide. The screen was then drawn into a pipe 60" long and 6" in diameter, and 360 gms. of tantalum pentachloride were introduced on either side of the inverted screen. The pipe was then closed by a cap provided at both ends thereof, evacuated by a vacuum pump, and set in a tank of hot water six hours, the water being heated for one hour. The pipe was withdrawn, opened, the screen removed, and the product was shaken off and recrystallized from chloroform. A yield of 2 oz. of tantalum biscyclopentadienylium trichloride was obtained.

*Example V*

About 24 lbs. of sodium hydride are distributed on a screen. The screen is then drawn into a pipe, for example a pipe 60 feet long and 6 inches in diameter, and provided with end caps having inlet and outlets, respectively, therein. The pipe is associated with a rocker arm for effecting lateral reciprocation of the pipe. The assembly comprising the screen carrying the sodium hydride, the pipe and the rocker arm is immersed in ice water (32° F.). Cyclopentadiene is introduced into the pipe through an inlet, in one end thereof, an outlet in the opposite end cap being connected to a vacuum pump by a trap. As the reaction proceeds, it becomes less violent and the temperature may be allowed to rise. When the efflux stream contains only a minor amount of hydrogen and a major amount of cyclopentadiene, the temperature of the water bath is increased by the use of steam coils (not shown) and the reaction goes to completion, with continuous rocking of the pipe.

The temperature of the water is then raised to the boiling point and ferric chloride vapor is led in, the efflux emerging through one of the outlets to a trap system backed by a vacuum pump. A mixture of ferric chloride ($FeCl_3$) and ferric bicyclopentadienyl [$Fe(C_5H_5)_2$] condenses in the trap and is removed and steam distilled. The ferric chloride remains behind as $FeCl_3 \cdot 6H_2O$, or in aqueous solution. The ferric biscyclopentadienyl that comes over separates out and may be purified by re-crystallization from tetrahydrofuran, toluene or "Cellosolve." On recrystallization from tetrahydrofuran, a yield of about 70% is obtained.

The transition metal cyclopentadienyls or their cyclopentadienylium cations may be used as such or converted to various organic derivatives by usual methods.

As will be apparent the invention provides alkali metal and alkaline earth metal cyclopentadienyls in a condition suitable for use in the continuous production of volatile transition metallo-biscyclopentadienyls, or in the batch production of less volatile metallo-bicyclopentadienylium cations in which gas-phase volatile metal polyhalides are used as one reactant. The processes described have the advantages of simplicity and economy.

Since some changes and modifications may be made in carrying out the methods disclosed herein without departing from the spirit and scope of the invention except as defined in the appended claims.

What is claimed is:

A method of producing tantalum biscyclopentadienylium trichloride which comprises distributing particles of calcium cyclopentadienyl on a screen support arranged in an evacuated chamber, passing gaseous tantalum pentachloride in contact with said calcium cyclopentadienyl disposed on the screen support in the evacuated chamber and heated at the temperature of boiling water, removing the crude tantalum biscyclopentadienylium trichloride thus formed from the screen support, and re-crystallizing the same from chloroform to recover tantalum biscyclopentadienylium trichloride.

References Cited in the file of this patent

UNITED STATES PATENTS

| | | |
|---|---|---|
| 2,791,597 | Anzilotti et al. | May 7, 1957 |
| 2,817,674 | Graham et al. | Dec. 24, 1957 |

OTHER REFERENCES

Wilkinson et al.: Chemistry and Industry (March 13, 1954), p. 307.

Weygand: Organic Preparations, Interscience Publishers, New York (1945), page 365.

Hansley: Ind. and Eng. Chem., vol. 43, No. 8, (1951), pp. 1759–1766.